(12) United States Patent
Lee

(10) Patent No.: US 7,506,911 B2
(45) Date of Patent: Mar. 24, 2009

(54) FRONT PILLAR APPARATUS

(75) Inventor: Jae Hyuck Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 10 days.

(21) Appl. No.: 11/818,427

(22) Filed: Jun. 13, 2007

(65) Prior Publication Data

US 2008/0143149 A1 Jun. 19, 2008

(30) Foreign Application Priority Data

Dec. 13, 2006 (KR) .................. 10-2006-0127408

(51) Int. Cl.
*B62D 25/04* (2006.01)
(52) U.S. Cl. .............. 296/96.21; 296/193.06; 296/193.12; 296/203.02; 296/210
(58) Field of Classification Search ............ 296/203.02, 296/203.03, 193.05, 193.06, 193.09, 193.12, 296/30, 96.12, 210
See application file for complete search history.

(56) References Cited

U.S. PATENT DOCUMENTS

| | | | | |
|---|---|---|---|---|
| 5,586,799 A | * | 12/1996 | Kanemitsu et al. ..... | 296/203.02 |
| 5,941,597 A | * | 8/1999 | Horiuchi et al. ........ | 296/203.01 |
| 6,116,680 A | * | 9/2000 | Hunter et al. .......... | 296/203.03 |
| 6,854,790 B2 | * | 2/2005 | Yoshida .................. | 296/187.05 |
| 6,962,389 B2 | * | 11/2005 | Katsuma ................. | 296/187.12 |
| 7,021,700 B2 | * | 4/2006 | Yoshida .................. | 296/187.05 |
| 7,267,388 B2 | * | 9/2007 | Hanson et al. ............. | 296/77.1 |
| 7,344,186 B1 | * | 3/2008 | Hausler et al. ......... | 296/187.05 |
| 2007/0063546 A1 | * | 3/2007 | Lassl et al. ............. | 296/193.06 |

FOREIGN PATENT DOCUMENTS

JP 07-196052 8/1995

* cited by examiner

*Primary Examiner*—Glenn Dayoan
*Assistant Examiner*—Gregory Blankenship
(74) *Attorney, Agent, or Firm*—Edwards Angell Palmer & Dodge LLP; Peter F. Corless

(57) ABSTRACT

A front pillar apparatus of a vehicle includes a panel portion supporting a windshield of the vehicle from an upper portion of the vehicle and a pillar portion connected to both ends of the panel portion to support the panel portion, wherein the panel portion includes an outer panel disposed in an outward direction of the vehicle and an inner panel disposed in an inward direction of the vehicle and formed to be extended in an direction of the outer panel, which apparatus has improved stiffness.

4 Claims, 3 Drawing Sheets

US 7,506,911 B2

FRONT PILLAR APPARATUS

CROSS-REFERENCE TO RELATED APPLICATION

This application claims priority to and the benefit of Korean Patent Application No. 10-2006-0127408 filed on Dec. 13, 2006, the entire contents of which are incorporated herein by reference.

BACKGROUND OF THE INVENTION (a) Technical Field

The present invention relates to a front pillar apparatus of a vehicle. More particularly, the present invention relates to a front pillar apparatus that improves stiffness.

(b) Background Art

A front pillar apparatus supports a windshield and a roof of a vehicle.

Typically, for example, a convertible car includes a pipe inserted in the pillar for improving the stiffness of the front pillar apparatus to provide protection in the event of vehicle overturn.

Prior art technologies proposed methods for improving the stiffness. One proposed method was to include an additional constituent in a portion connected to the roof (i.e., a portion supporting an upper part of the windshield). Another method was to make wider the portion supporting the windshield.

The prior art methods, however, have problems. For instance, the wider portion supporting the windshield can injure the head of an occupant in the event of vehicle crash. It can also impede driver's view.

In addition, the wider portion or the additional constituent can increase manufacturing costs and make manufacturing process complicated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a front pillar apparatus with improved stiffness, which can simplify manufacturing process thereof and reduce manufacturing costs.

An exemplary embodiment of the present invention provides a front pillar apparatus of a vehicle including a panel portion supporting a windshield of the vehicle from an upper portion of the vehicle and a pillar portion connected to both ends of the panel portion to support the panel portion, wherein the panel portion includes an outer panel disposed in an outward direction of the vehicle and an inner panel disposed in an inward direction of the vehicle and formed to be extended in a direction of the outer panel.

Preferably, the pillar portion includes a first panel disposed in an outward direction of the vehicle and formed to be connected to the inner panel at a first connecting point located at a position below the outer panel, a second panel connected to the inner panel and the first panel and the inner panel at the first connecting point, and a third panel connected to the inner panel at a second connecting point formed at a position below the first connecting point.

Suitably, the second panel may be formed to be extended so as to be connected to the inner panel and the third panel at the second connecting point.

The present apparatuses may further include a fourth panel connected to the first panel and the second panel.

In a preferred embodiment, the outer panel, the inner panel, and the first panel may form a first space, the inner panel and the second panel may form a second space, and the second panel and the third panel may form a third space.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present apparatuses will be particularly useful with a wide variety of motor vehicles.

Other aspects of the invention are discussed infra.

Figure 1:
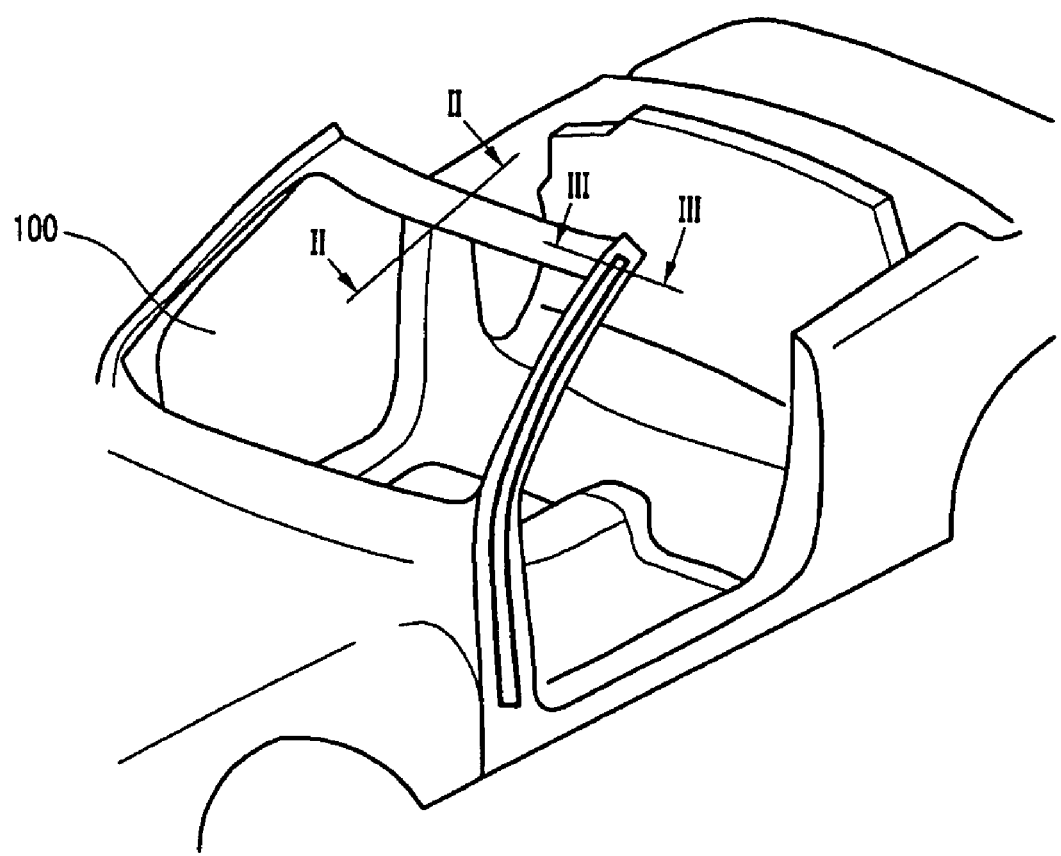
FIG. 1 shows a front pillar apparatus according to an exemplary embodiment of the present invention.

Reference numerals set forth in the Drawings includes reference to the following elements as further discussed below:

100: windshield
201: outer panel
203: inner panel
205: first panel
207: second panel
209: third panel
211: first connecting point
213: second connecting point
215: fourth panel
217: first space
219: second space
221: third space

DETAILED DESCRIPTION OF THE PREFERRED EMBODIMENTS

An exemplary embodiment of the present invention will hereinafter be described in detail with reference to the accompanying drawings.

Figure 2:
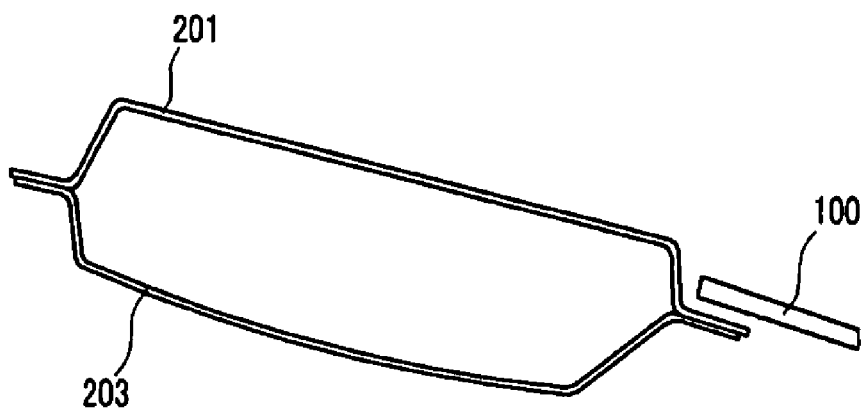
FIG. 2 is a cross-sectional view along the II-II line in FIG. 1.
Figure 3:
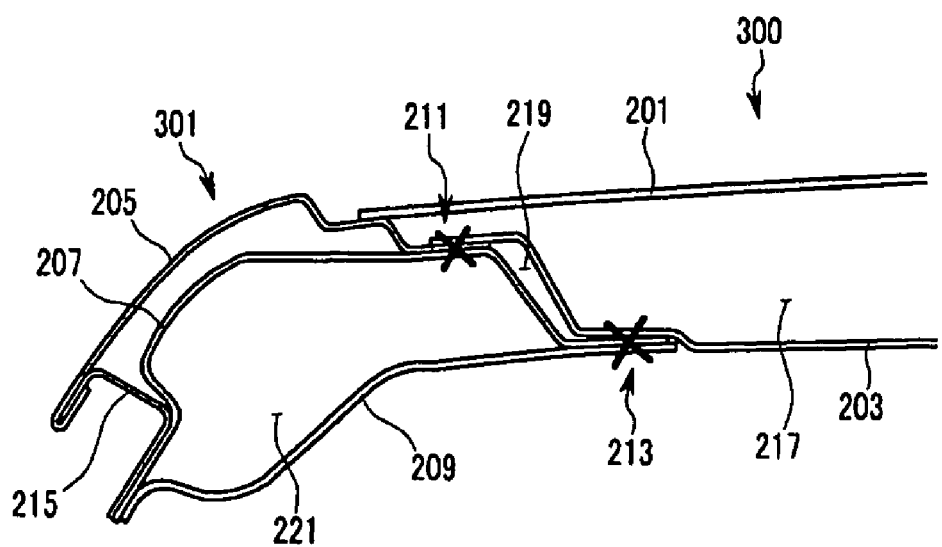
FIG. 3 is a cross-sectional view along the III-III line in FIG. 1.

FIG. 1 shows a front pillar apparatus according to an exemplary embodiment of the present invention. FIG. 2 is a cross-sectional view along the II-II line in FIG. 1. FIG. 3 is a cross-sectional view along the III-III line in FIG. 1.

As shown in FIG. 1 to FIG. 3, according to an exemplary embodiment of the present invention, a front pillar apparatus of a vehicle includes a panel portion 300 and a pillar portion 301.

The panel portion 300 supports a windshield 100 of the vehicle from an upper portion of the vehicle, and the pillar portion 301 is connected to both ends of the panel portion 300 to support the panel portion 300.

The panel portion 300 includes an outer panel 201 and an inner panel 203.

The outer panel 201 is disposed in an outward direction of the vehicle, and the inner panel 203 is disposed in an inward direction of the vehicle and is formed to be extended in a direction of the outer panel 201.

That is, referring to FIG. 2, the panel portion 300 is formed by connecting the outer panel 201 with the outer panel 201 and the windshield 100 is connected to an end of the panel portion 300.

Referring to FIG. 3, the pillar portion 301 includes a first panel 205, a second panel 207, and a third panel 209.

The first panel 205 is disposed in an outward direction of the vehicle and is formed to be connected to the inner panel 203 at a first connecting point 211 located at a position below the outer panel 201.

The second panel 207 is connected to the inner panel 203 and the first panel 205 at the first connecting point 211.

The third panel 209 is connected to the inner panel 203 at a second connecting point 213 formed at a position below the first connecting point 211.

That is, referring to FIG. 3, the inner panel 203 is formed to be extended in a direction of the pillar portion 301 and is bent in a direction of the outer panel 201.

The first panel 205, the inner panel 203, and the second panel 207 are connected to the first connecting point 211.

The second panel 207 is formed to be extended so as to be connected to the inner panel 203 and the third panel 209 at the second connecting point 213.

That is, at the second connecting point 213, the inner panel 203, the second panel 207, and the third panel 209 are connected together.

According to an exemplary embodiment of the present invention, because the three panels are connected together at the two connecting points, the stiffness of front pillar apparatuses can be improved.

In addition, because only two connecting points are formed to produce a front pillar apparatus, the manufacturing process can be simplified and manufacturing costs can be reduced.

According to an exemplary embodiment of the present invention, the front pillar apparatus may further include a fourth panel 215 connected to the first panel 205 and the second panel 207.

That is, the first panel 205 and the second panel 207 are connected together by the fourth panel 215 at an opposite side in which the connecting points are formed.

The stiffness of the front pillar apparatus may further be improved by the fourth panel 215.

Further, the outer panel 201 and the inner panel 203 form a first space 217, the inner panel 203 and the second panel 207 form a second space 219, and the second panel 207 and the third panel 209 form a third space 221.

For example, the first, second, and third spaces 217, 219, and 221 can be formed as shown in FIG. 3, which can further improve the stiffness of front pillar apparatuses.

That is, if a front pillar apparatus is applied by an impact in the event of vehicle crash or overturn, the first, second, and third spaces 217, 219, and 221 can buffer or absorb the impact while the panels of the panel portion 300 and the pillar portion 301 are deformed.

As described above, the stiffness of front pillar apparatuses can be improved, manufacturing process can be simplified and manufacturing costs can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A front pillar apparatus of a vehicle, comprising:
   a panel portion supporting a windshield of the vehicle from an upper portion of the vehicle; and
   a pillar portion connected to both ends of the panel portion to support the panel portion,
   wherein the panel portion comprises
   an outer panel disposed in an outward direction of the vehicle, and
   an inner panel disposed in an inward direction of the vehicle and formed to be extended in a direction of the outer panel, and
   wherein the pillar portion comprises
   a first panel disposed in an outward direction of the vehicle and formed to be connected to the inner panel at a first connecting point located at a position below the outer panel,
   a second panel connected to the inner panel and the first panel at the first connecting point, and
   a third panel connected to the inner panel at a second connecting point formed at a position below the first connecting point.

2. The apparatus of claim 1, wherein the second panel is formed to be extended so as to be connected to the inner panel and the third panel at the second connecting point.

3. The apparatus of claim 1, further comprising a fourth panel connected to the first panel and the second panel.

4. The apparatus of claim 2, wherein the outer panel, the inner panel, and the first panel form a first space, the inner panel and the second panel form a second space, and the second panel and the third panel form a third space.

* * * * *